United States Patent Office 2,901,787
Patented Sept. 1, 1959

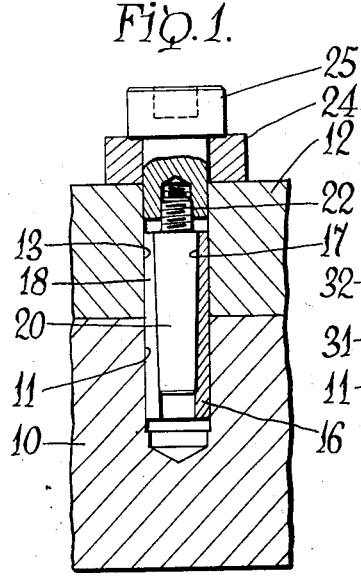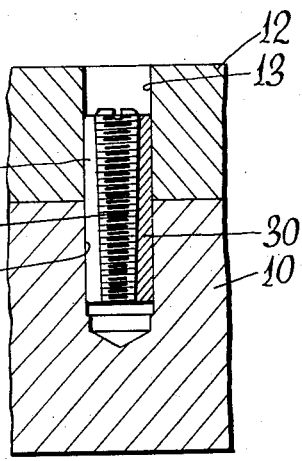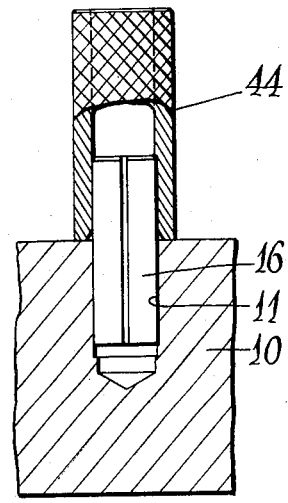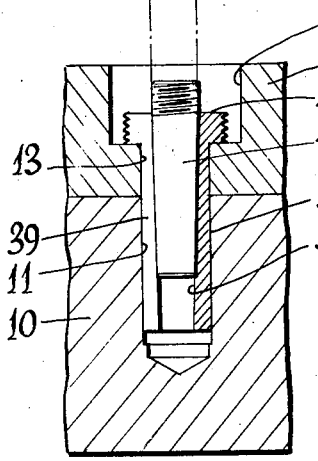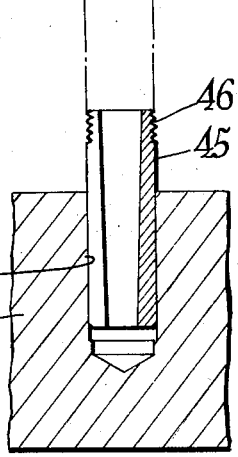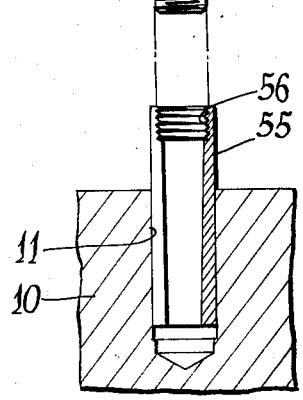

2,901,787

DOWEL STRUCTURE INCLUDING EXPANSION AND TAPERED PIN MEANS

Lawrence V. Whistler, Sr., and Lawrence V. Whistler, Jr., Kenmore, N.Y.

Application March 6, 1957, Serial No. 644,411

2 Claims. (Cl. 20—92)

This invention relates to metal dowels of the kind which are employed in accurately locating one metal part with respect to another, particularly in the construction of dies, tools, fixtures and special machinery.

In the construction of the above-mentioned tools, dies and the like, it is the common and usual practice to employ screws or similar fasteners for securing parts to each other, supplemented by metal dowel pins for holding the parts in accurate relative positions and for preventing displacement thereof in direction at right angles to the axis of the dowel pin. The usual practice is to drill and accurately ream holes in two or more parts which are to be secured against each other and then force a tight-fitting solid metal dowel pin of precise diameter into the aligned holes.

Establishing and maintaining accurate diameters as between the dowel holes and the dowels themselves is laborious and time-consuming and subsequent removal of the tight-fitting dowels, when disassembly is required, is very difficult. In addition to other disassembly problems and complications, it is considered essential in present day practice that dowel holes must extend entirely through the two or more assembled parts which are located thereby to permit driving the dowels from the holes when disassembly is required.

Since one of the parts is frequently of very substantial thickness, this necessity for through drilling and reaming adds to the cost of construction, removes metal which might otherwise contribute to strength and rigidity, and otherwise complicates the doweling problem. Furthermore, the necessarily forcible removal of solid dowels may damage one or both of the doweled parts, necessitating costly replacement and repair.

The present invention provides an expansible dowel structure which greatly facilitates application and removal of the dowels. An important feature of the expansible dowel structure of the present invention resides in the fact that the same may be successfully used in blind holes, that is, when the dowel hole in one of the pieces to be secured does not extend entirely through the piece.

With the arrangement of this invention such blind holes may be employed without preventing or complicating removal of the dowels to disassemble the parts. Furthermore, the dowel structure herein proposed is such that a rigid and practically solid dowel structure is provided, despite the fact that the same is of an expansible and contractible nature and may be readily released and removed when desired.

Various other objects and advantages attendant upon the use of the dowel structures and appurtenances of the present invention will become apparent to those skilled in the toolmaking art and allied arts from a study of the several embodiments illustrated in the accompanying drawing and described in detail in the following specification. However, it is to be understood that the embodiments thus set forth are by way of example only and that the principles of the present invention are not limited thereto or otherwise than as defined in the appended claims.

In the drawing:

Fig. 1 is a vertical cross sectional view through one form of the dowel structure of the present invention shown in a doweling position with respect to a pair of doweled parts and with means for withdrawing the dowel expansion member in position thereon;

Fig. 2 is a similar view of a modified form of dowel expansion member;

Fig. 3 is a similar view of a modified dowel structure with a dowel expander removing tool shown thereabove;

Fig. 4 is a similar view showing means for removing the dowel element itself with such removing means partly in elevation;

Fig. 5 is a similar cross-sectional view showing modified means for removing the dowel element; and Fig. 6 is a similar cross-sectional view showing a further modified means for removing the dowel element.

Like characters of reference denote like parts in the several figures of the drawing and, throughout the several views, the numeral 10 designates a base member having an accurately reamed dowel hole 11 which enters one surface of the member and does not necessarily extend through, although it may do so if desired. The numeral 12 designates a companion member which has a reamed hole 13 of the same diameter as hole 11 and aligned therewith for jointly receiving a dowel. While the dowel construction of the present invention is of general application, a common and typical instance of use would be one in which the member 10 is a die shoe or punch holder and the member 12 is a die block or punch block of hardened tool steel.

In the embodiment of Fig. 1 the dowel member itself is designated 16 and comprises a cylindrical body having a tapered axial bore 17 and a longitudinal slot 18 extending the length of the wall thereof. A tapered pin 20 has a tapered outer periphery matching the taper of bore 17 and the dowel is applied by inserting the dowel member 16 into the aligned holes 11 and 13 and driving the same securely home to expand the dowel member 16 into secure engagement in the aligned holes 11 and 13.

It will be noted that the tapered pin 20 has a reduced threaded extension 22 at its larger end which is provided solely for removal purposes, the dowel structure being otherwise complete as described in the preceding paragraph. With the tapered pin 20 in assembled position in the dowel member 16 these two parts act substantially as a solid dowel member substantially throughout the length of the dowel member 16, with the exception that the thus expanded dowel member engages the dowel holes 11 and 13 in a much more secure and close-fitting fashion than could possibly be achieved in the usual method of driving a solid dowel pin into aligned dowel holes.

When it is desired to permit the dowel member 16 to contract so that the members 10 and 12 may be disassembled, a washer or collar 24 is placed as shown in Fig. 1 and a socket head screw member 25 having an internally threaded shank is screwed over the threaded extension 22 of the tapered pin 20, likewise as illustrated in Fig. 1. Continued turning of the screw 25 with a suitable wrench or the like withdraws the tapered pin 20 sufficiently to release the same from binding engagement in the dowel member 16 so that it may be lifted from its assembled position, most conveniently in the present instance by merely lifting the engaged screw 25. With the expanding force thus removed the members 10 and 12 may simply be pulled apart with no resistance from the dowel member 16.

In the embodiment of Fig. 2 a cylindrical dowel member 30 has a tapered threaded hole 31 extending therethrough and is likewise longitudinally slotted as at 32. A tapered threaded pin 33 is screwed into the threaded hole 31 with the dowel member 30 in position in the aligned dowel holes 11 and 13 to expand the dowel member into secure locating engagement, similarly to the preceding embodiment. Obviously, in this embodiment release of the expanding locking engagement of the dowel member is effected by simply unscrewing the tapered threaded pin 33.

Reference will now be had to the embodiment illustrated in Fig. 3 wherein the dowel element, in addition to the doweling function, comprises means for holding the blocks 10 and 12 against each other, thus dispensing with the usual separate screws or bolts employed for that purpose. In Fig. 3 the dowel hole 13 in the member 12 is counterbored as at 36. The dowel element is designated 37 and comprises a cylindrical body member having a tapered axial bore 38 and, as in the preceding instances, is split longitudinally as at 39.

Dowel element 37 is provided with an enlarged head 40 which seats against the bottom of the counterbore 36 and when a tapered pin 41 is forced into the opening of the dowel member, as in the embodiment of Fig. 1, the dowel member is urged securely downwardly during its expanding movement so that the enlarged head formation 40 serves the same holding function as a screw or bolt head. As in the embodiment of Fig. 1, tapered pin 40 has a threaded upper end portion 42 and an internally threaded wrench member 43 releases the tapered pin 41 by action of the lower end of the wrench member against the top of the head formation 40 when the internal threads of wrench member 43 are engaged fully over the threaded end portion 42 of tapered pin 41.

Head formation 40 of dowel member 37 is externally threaded and an internally threaded wrench member similar to the wrench member 43 but threaded to fit the external threads of head formation 40 may be employed to lift the dowel member 37 from the members 10 and 12 after the tapered pin 41 has been released.

The releasing and lifting wrench member 43 of Fig. 3 may be used in the general dowel arrangement of Fig. 1 instead of the means there shown and described for releasing the tapered pin 20.

Figs. 4, 5 and 6 show structures wherein the tapered locking pins, which are not illustrated in Figs. 4, 5 and 6, may be the same as in Figs. 1 or 3. In these embodiments the tapered pin has been removed and the upper member 12 has been lifted off of lower member 10, which is readily done when the dowel members are unexpanded. The means illustrated in Figs. 4, 5 and 6 are for the sole purpose of lifting the dowel members themselves from the blind holes in the lower members 10.

In Fig. 4 the dowel member 16 is the same as the dowel member 16 of Fig. 1 and a sleeve 44 has been forced or tapped over the upper projecting end of dowel member 16. The bore of sleeve 44 is preferably slightly smaller than the bore 11 which receives the dowel member and therefore forcing the sleeve 44 over the dowel member contracts the same whereby it may readily be lifted from the dowel hole 11 in member 10. In Fig. 4 the exterior periphery of sleeve 44 is shown knurled to facilitate gripping the same and the lower end of the bore therein has a beveled enlargement to facilitate forcing the sleeve over the dowel member 16.

In Fig. 5 the dowel member is designated 45 and is the same as the dowel member of Figs. 1 and 4, excepting that its upper end is externally threaded as at 46 to engage with internal threads of a wrench member 47, whereby the wrench member may be used to pull the dowel member from the dowel hole in member 10.

The embodiment of Fig. 6 is the same as that of Fig. 5 excepting that dowel member 55 is internally threaded as at 56 to receive external threads of a wrench-like lifting member 57 which likewise is employed for lifting dowel member 55 from block 10.

We claim:
1. A locating and securing structure comprising a pair of abutting parts to be located and secured to one another, one of said parts having a through hole therein, the other of said parts having a blind hole formed in one surface thereof, said one part being abutted against said surface, said through hole being aligned with said blind hole, each of said holes being substantially cylindrical in configuration, and being accurately dimensioned, a doweling and retaining construction comprising a substantially cylindrical body member disposed within the aligned holes in said parts, said body member having a longitudinally extending bore formed therethrough, said bore having a substantially smooth and uniformly tapered surface extending from one end of the body member to the other end thereof and defining a frusto-conical configuration, said body member having a longitudinally extending slot formed completely through the wall thereof and extending from one end of the body member to the opposite end thereof to permit uniform resilient diametrical expansion of the body member throughout its entire length, a tapered pin engageable in said bore to expand the member diametrically into tight engagement with said parts, said tapered pin having a substantially smooth, uniformly tapered outer surface extending from one end of the pin to the other end thereof and defining a substantially frusto-conical configuration complementary to that defined by the surface of the bore in the body member, said pin having a large end and a small end, the small end of the pin and the portion of the body member having a bore of least diameter being disposed within the blind hole in said other part, and the opposite end portions of said body member and said pin being disposed within the through hole in said one part, whereby the pin may be driven lineally into the bore of said body member, an extension extending longitudinally of the large end of the pin and projecting outwardly thereof, said extension having a diameter no greater than the diameter of said large end and said extension being adapted to project from the body member when in fully expanded position therein, said extension having threads formed on the external surface thereof, said threaded extension being spaced from said body member and said one part and being adapted to receive an annular internally threaded member adapted to abut against structure surrounding said pin to effect a forceable withdrawal of the tapered pin longitudinally and lineally out of said body member upon rotation of an annular internally threaded member threadedly mounted on said extension relative to the pin.

2. Apparatus as defined in claim 1, wherein said cylindrical body member is provided with an annular laterally extending enlarged portion at the said opposite end portion thereof, said annular enlarged portion being adapted to engage against said one part to urge it toward the other of said parts when the tapered pin is driven into the bore in the body member, said annular enlarged portion having threads formed on the outer surface thereof for receiving a removing dowel having complementary threads.

References Cited in the file of this patent
UNITED STATES PATENTS

| 1,810,749 | Bowler | June 16, 1931 |
| 1,823,428 | Hill | Sept. 15, 1931 |
| 1,969,426 | Ross | Aug. 7, 1934 |
| 2,100,873 | Roberts | Nov. 30, 1937 |
| 2,384,918 | Houk | Sept. 18, 1945 |
| 2,581,240 | Day et al. | Jan. 1, 1952 |